УС010781933B2

United States Patent
Ohashi (10) Patent No.: US 10,781,933 B2
(45) Date of Patent: Sep. 22, 2020

(54) REGULATING VALVE WITH PLANETARY GEAR TRANSMISSION

(71) Applicant: Azbil Corporation, Tokyo (JP)

(72) Inventor: Tomofumi Ohashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 71 days.

(21) Appl. No.: 15/887,258

(22) Filed: Feb. 2, 2018

(65) Prior Publication Data

US 2018/0224019 A1    Aug. 9, 2018

(30) Foreign Application Priority Data

Feb. 3, 2017  (JP) ................... 2017-018449

(51) Int. Cl.
  *F16K 31/04*    (2006.01)
  *F16H 1/36*    (2006.01)
  (Continued)

(52) U.S. Cl.
  CPC ............ *F16K 31/045* (2013.01); *F16H 1/36* (2013.01); *F16K 31/041* (2013.01);
  (Continued)

(58) Field of Classification Search
  CPC ........ F16K 31/045; F16K 31/041; F16H 1/36; F16H 1/28; F16H 1/2818; F24F 2013/1433
  See application file for complete search history.

(56) References Cited

U.S. PATENT DOCUMENTS

| 1,431,167 A | * 10/1922 | McCollum | ............... F16H 1/46 475/342 |
| 1,777,490 A | * 10/1930 | Hardie | ................... F16H 1/28 475/337 |

(Continued)

FOREIGN PATENT DOCUMENTS

| JP | H03-260436 A | 11/1991 |
| JP | H08-271302 A | 10/1996 |

(Continued)

OTHER PUBLICATIONS

Korean Intellectual Property Office, "Notification of Reason for Refusal," issued in Korean Patent Application No. 10-2018-0013252, which is a counterpart to U.S. Appl. No. 15/887,258, dated Jun. 3, 2019, 7 pages (4 pages of English Translation of Office Action and 3 pages of Original Office Action).

(Continued)

*Primary Examiner* — Tinh Dang
(74) *Attorney, Agent, or Firm* — Amster, Rothstein & Ebenstein LLP (57) ABSTRACT

An actuator includes: a fixed internal gear that is formed in an annular shape, has a tooth on an inner peripheral surface thereof, and is non-rotatably provided; a movable internal gear that is formed in an annular shape, has a tooth on an inner peripheral surface thereof, and is rotatably provided coaxially with the fixed internal gear; a plurality of external gears that mesh with the fixed internal gear and the movable internal gear, and rotate along an inner peripheral surface of the fixed internal gear; and a carrier that is formed in an annular shape, rotatably supports the external gears, has a tooth for receiving a turning force from a drive motor on an outer peripheral surface thereof, transmits a turning force from the drive motor to the external gears, and is rotatably provided coaxially with the movable internal gear.

3 Claims, 6 Drawing Sheets

(51) Int. Cl.
    F16K 31/53    (2006.01)
    F16H 1/28     (2006.01)
    F24F 13/14    (2006.01)
    F16H 57/08    (2006.01)
(52) U.S. Cl.
    CPC .............. F16K 31/535 (2013.01); *F16H 1/28*
                    (2013.01); *F24F 2013/1433* (2013.01)

(56) References Cited

U.S. PATENT DOCUMENTS

| | | | | |
|---|---|---|---|---|
| 2,401,875 | A * | 6/1946 | Lawler | F16H 1/46 |
| | | | | 475/342 |
| 5,242,336 | A * | 9/1993 | Hori | F16H 1/46 |
| | | | | 475/220 |
| 5,286,235 | A * | 2/1994 | Gerat | B25J 9/102 |
| | | | | 475/162 |
| 5,385,514 | A * | 1/1995 | Dawe | F16H 13/06 |
| | | | | 475/336 |
| 8,794,591 | B2 | 8/2014 | Arai | |
| 8,834,316 | B2 * | 9/2014 | Berg | F16H 1/28 |
| | | | | 475/341 |
| 9,381,974 | B2 | 7/2016 | Katsura et al. | |
| 9,810,109 | B2 * | 11/2017 | Pluta | F01L 1/352 |
| 10,145,259 | B2 * | 12/2018 | Sheridan | F16H 1/2809 |
| 10,323,576 | B2 * | 6/2019 | Prunera-Usach | F02C 7/32 |

FOREIGN PATENT DOCUMENTS

| | | |
|---|---|---|
| JP | 2001-153189 A | 6/2001 |
| JP | 2012-067835 A | 4/2012 |
| JP | 2014-091384 A | 5/2014 |
| KR | 20140087476 A | 7/2014 |

OTHER PUBLICATIONS

The State Intellectual Property Office of People's Republic of China, "The First Office Action," issued in Chinese Patent Application No. 201810105910.4, which is a counterpart to U.S. Appl. No. 15/887,258, dated Mar. 4, 2019, 15 pages (8 pages of English Translation of Office Action and 7 pages of Original Office Action).
Korean Intellectual Property Office, "Notification of Reason for Refusal," issued in Korean Patent Application No. 10-2018-0160781, which is a counterpart to U.S. Appl. No. 15/887,258, dated Oct. 11, 2019, 6 pages (3 pages of English Translation of Office Action and 3 pages of Original Office Action).

* cited by examiner

REGULATING VALVE WITH PLANETARY GEAR TRANSMISSION

CROSS-REFERENCE TO RELATED APPLICATION

The present application claims the benefit of and priority to Japanese Patent Application No. 2017-018449, filed on Feb. 3, 2017, the entire contents of which are incorporated by reference herein.

TECHNICAL FIELD

The present invention relates to a setting/operating device for operating equipment, and relates, for example, to a setting/operating device for operating a valve stem of a rotary-type control valve.

BACKGROUND ART

In general, an electric setting/operating device (actuator) for operating a rotary-type control valve, such as a butterfly valve, and a damper shaft of a damper has many structural limitations. For example, in an actuator of a damper, a damper shaft protruding from a damper needs to be fixed to an output shaft of the actuator. Accordingly, space (a hole) through which the damper shaft is inserted is required on the inside of the actuator. For this reason, a power transmission mechanism (gear mechanism) in the actuator needs to have a hollow structure, and the power transmission mechanism and a drive motor cannot be arranged coaxially in a height direction.

A conventional electric actuator that deals with such structural limitations is disclosed in JP 2001-153189 A and JP 03-260436 A. Specifically, JP 2001-153189 A discloses a power transmission mechanism, in which an output axis of a motor has a hollow structure, and an output shaft that transmits an output from a gear mechanism is arranged in the hollow section, so that the output shaft and the output axis of the motor are arranged coaxially. JP 03-260436 A discloses a power transmission mechanism, in which a separate gear mechanism is provided between a sun gear of a planetary gear mechanism and a motor, so that an input shaft and an output shaft in an actuator are not arranged coaxially (are arranged in an offset manner).

SUMMARY

An electric actuator for operating a damper and the like has a limitation in a height direction in many cases depending on an installation environment, and has been demanded to be thinner.

However, in the actuator disclosed in JP 2001-153189 A, the output axis of the motor has a hollow structure. For this reason, a diameter of the output axis is larger than that of a general-purpose motor, and the motor has a large size as a result. Accordingly, reduction in thickness of the actuator is limited.

In the actuator disclosed in JP 03-260436 A, a volume is increased in a height direction as much as the size of the gear mechanism provided between the motor and the sun gear. Accordingly, reduction in thickness of the actuator is limited.

The present invention is made in view of the above problems. An object of the present invention is to obtain an electric actuator of a thinner type.

An actuator (100) according to the present invention includes: a fixed internal gear (1) that is formed in an annular shape, has a tooth (la) on an inner peripheral surface of the fixed internal gear, and is non-rotatably provided; a movable internal gear (2) that is formed in an annular shape, has a tooth (2d) on an inner peripheral surface of the movable internal gear, and is rotatably provided coaxially with the fixed internal gear; a plurality of external gears (4) that mesh with the fixed internal gear and the movable internal gear, and rotate along the inner peripheral surface of the fixed internal gear; and a carrier (3) that is formed in an annular shape, rotatably supports the external gears, has a tooth (30a) for receiving a turning force from a drive motor on an outer peripheral surface of the carrier, transmits the turning force from the drive motor to the external gears, and is rotatably provided coaxially with the movable internal gear.

The actuator may further include: the drive motor (5) arranged on an axis line different from a rotation axis of the movable internal gear; and a motor gear mechanism (6) connected to an output shaft of the drive motor, wherein the tooth (30a) formed on the outer peripheral surface of the carrier may mesh with a gear constituting the motor gear mechanism.

In the actuator, the carrier may be arranged coaxially with the movable internal gear between the fixed internal gear and the movable internal gear.

In the actuator, the movable internal gear may include: a through hole (2b) formed on a rotation axis of the movable internal gear; an annular groove (2a) concentric to the through hole, the annular groove being formed in a direction parallel to the rotation axis of the movable internal gear in an area between an outer peripheral surface of the movable internal gear and the through hole; and a tooth (2d) that is formed on an inner wall of the groove and meshes with the external gears.

In the actuator, each of the external gears has a through hole (4a) formed at a rotation axis of each of the external gears, and the carrier includes: a plurality of shaft members (31) inserted in the through holes of the external gears; a base (30) that has a tooth (30a) meshing with a gear constituting the motor gear mechanism on an outer peripheral surface of the carrier, and supports a first end of the shaft members; and a support member (32) that is arranged to face the base with the external gears sandwiched therebetween in a direction of a rotation axis of the external gears, and supports a second end of the shaft members.

In the above description, parenthesized reference signs corresponding to constituents of the invention are described on diagrams as an example.

As described above, according to the present invention, an electric actuator of a thinner type can be implemented.

DETAILED DESCRIPTION

Hereinafter, description will be made on an embodiment of the present invention with reference to the accompanying drawings. In the description below, constituents common in embodiments will be attached with the same reference signs, and duplicate description will be omitted.

Figure 1:
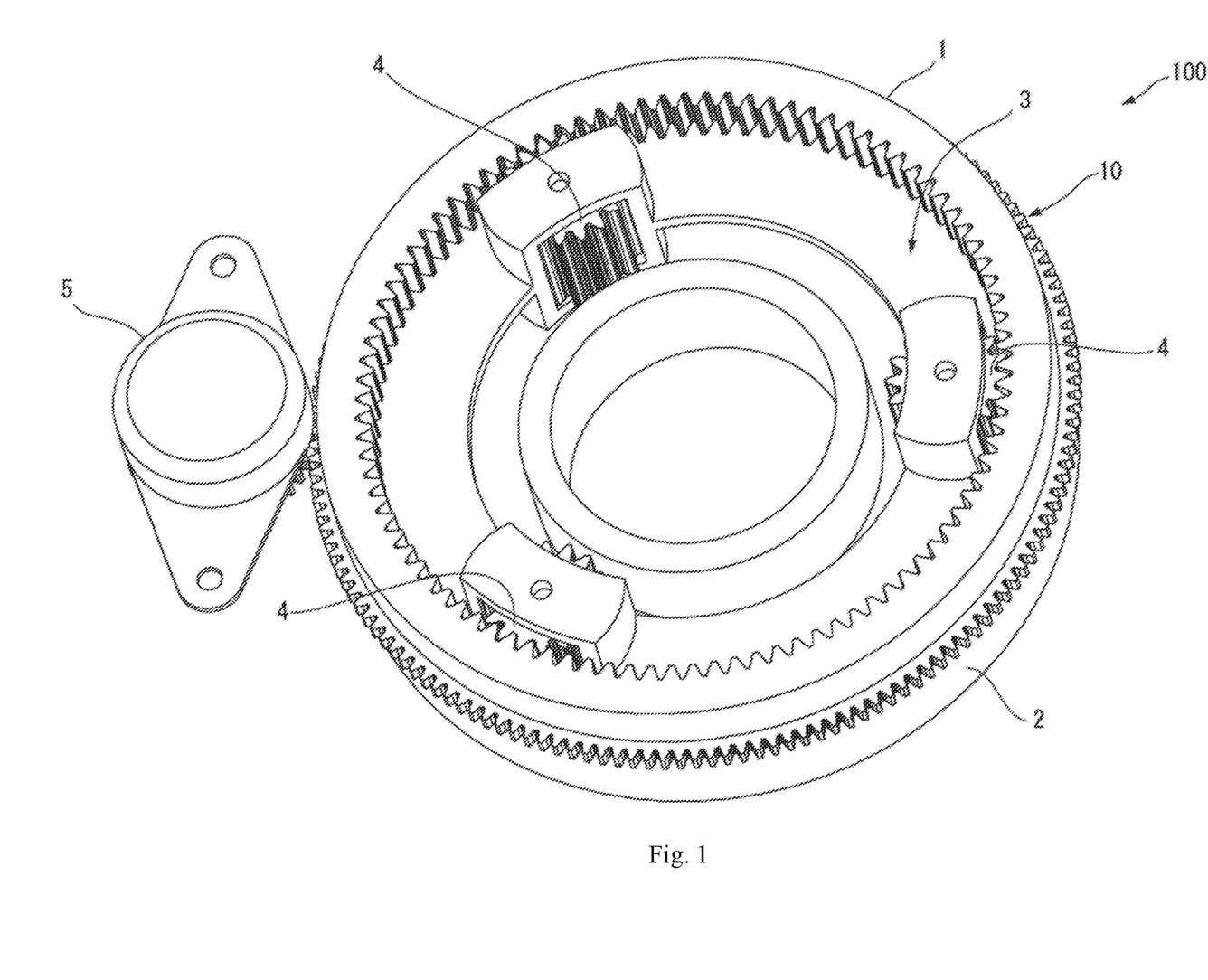
FIG. 1 is a perspective view showing a power transmission mechanism of an actuator according to an embodiment of the present invention.
Figure 2:
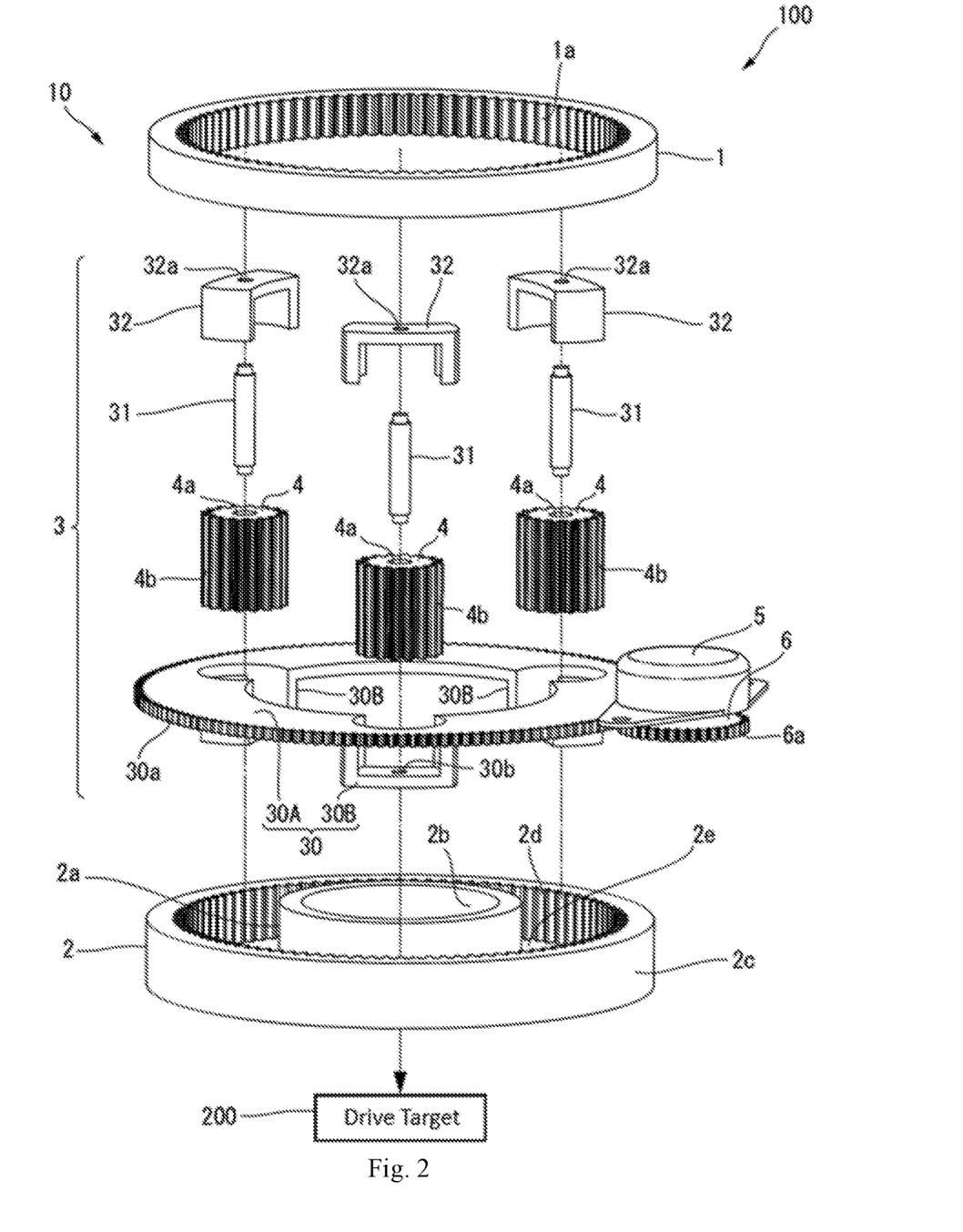
FIG. 2 is an exploded perspective view showing the power transmission mechanism of the actuator according to an embodiment of the present invention.
Figure 3:
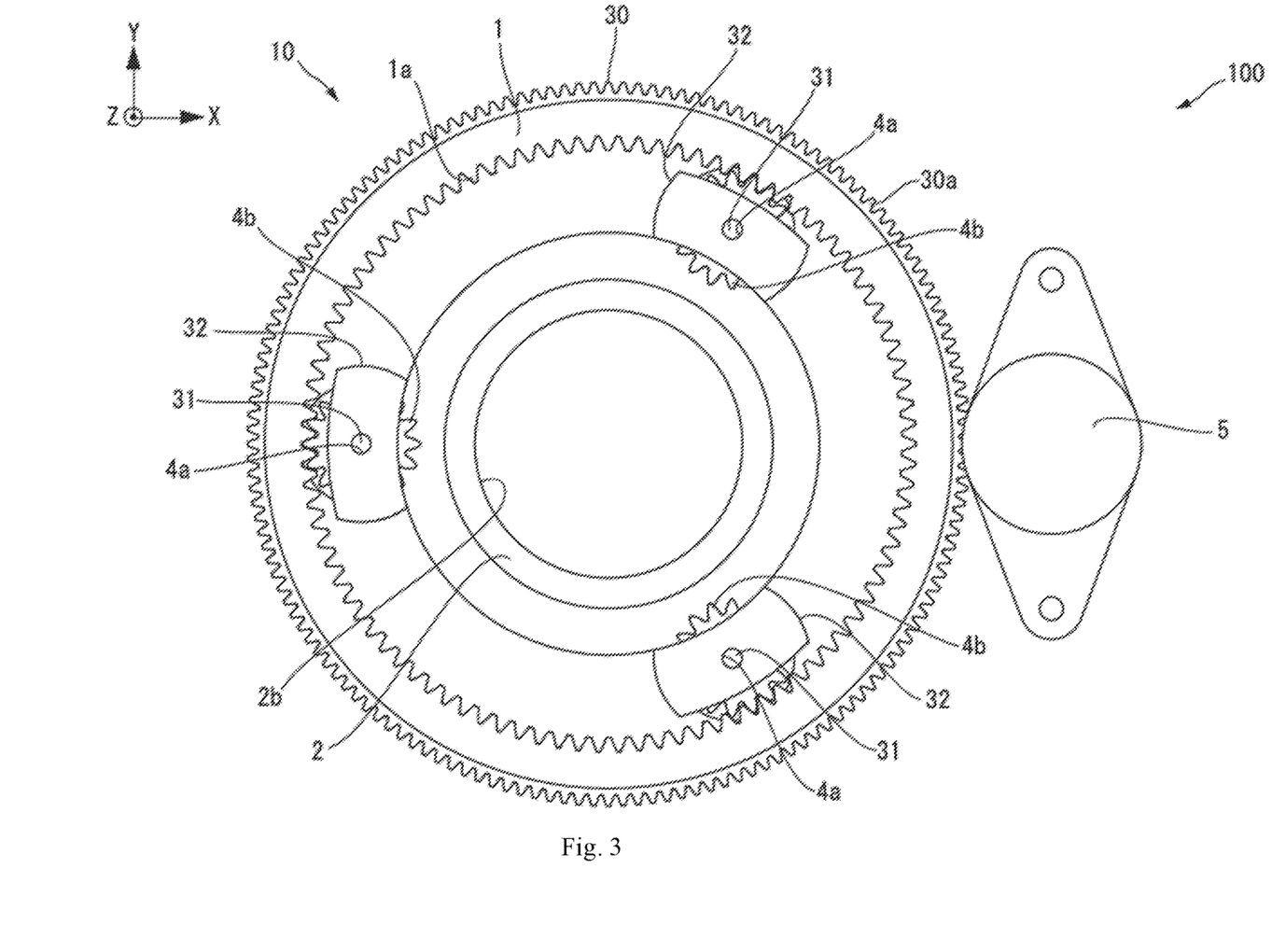
FIG. 3 is a plan view showing the power transmission mechanism of the actuator according to an embodiment of the present invention.
Figure 4:
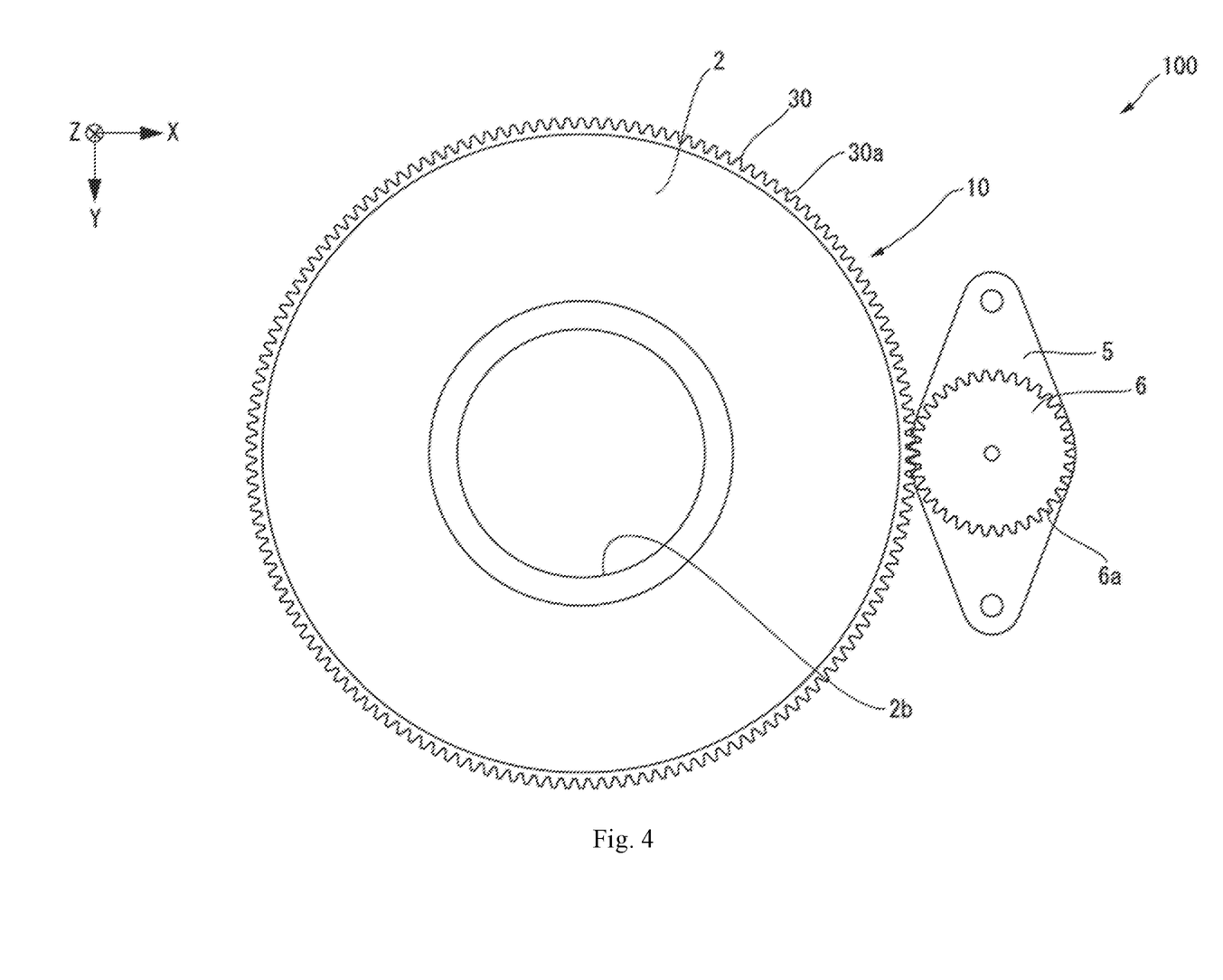
FIG. 4 is another plan view showing the power transmission mechanism of the actuator according to an embodiment of the present invention.
Figure 5:
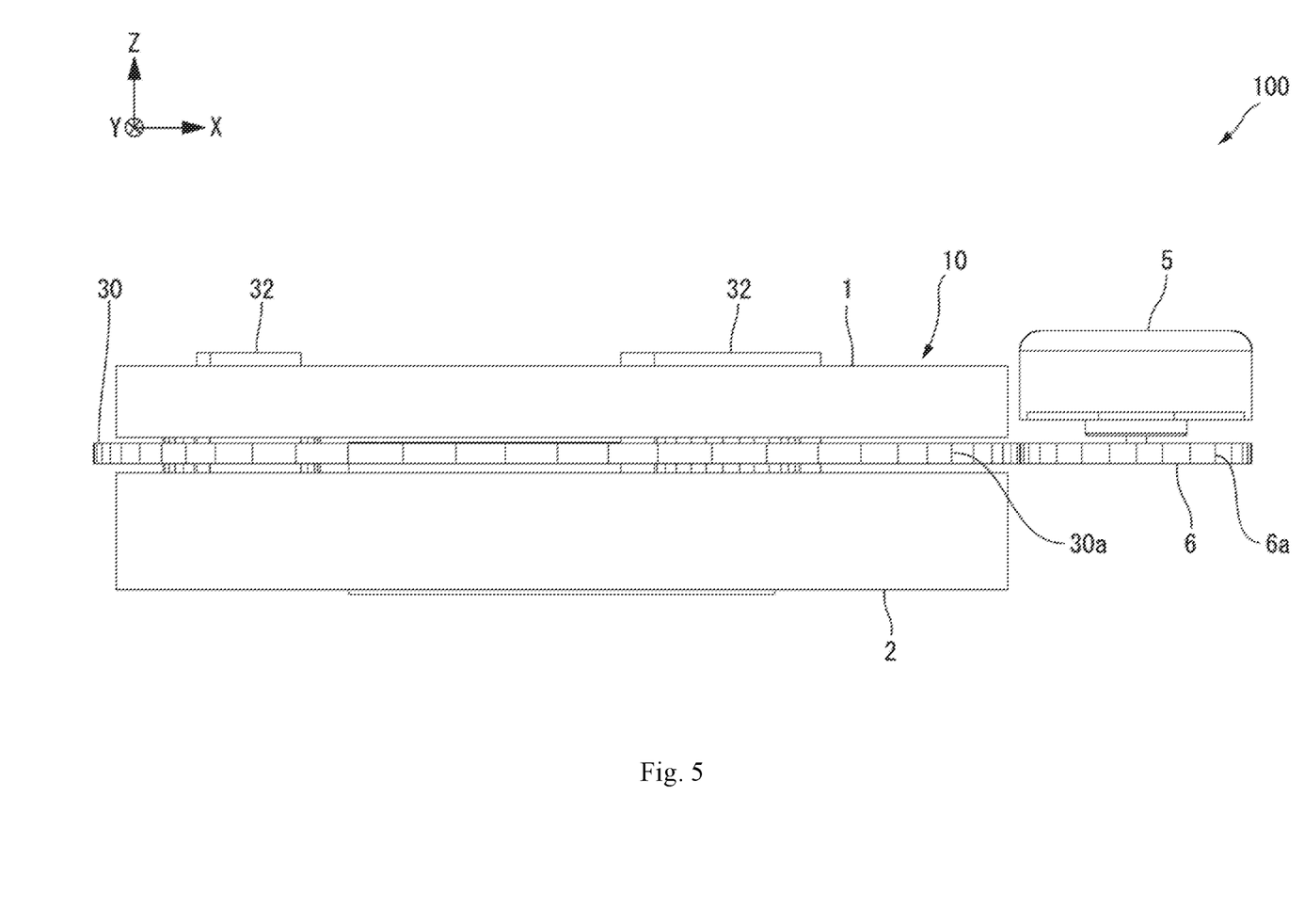
FIG. 5 is a front view showing the power transmission mechanism of the actuator according to an embodiment of the present invention.
Figure 6:
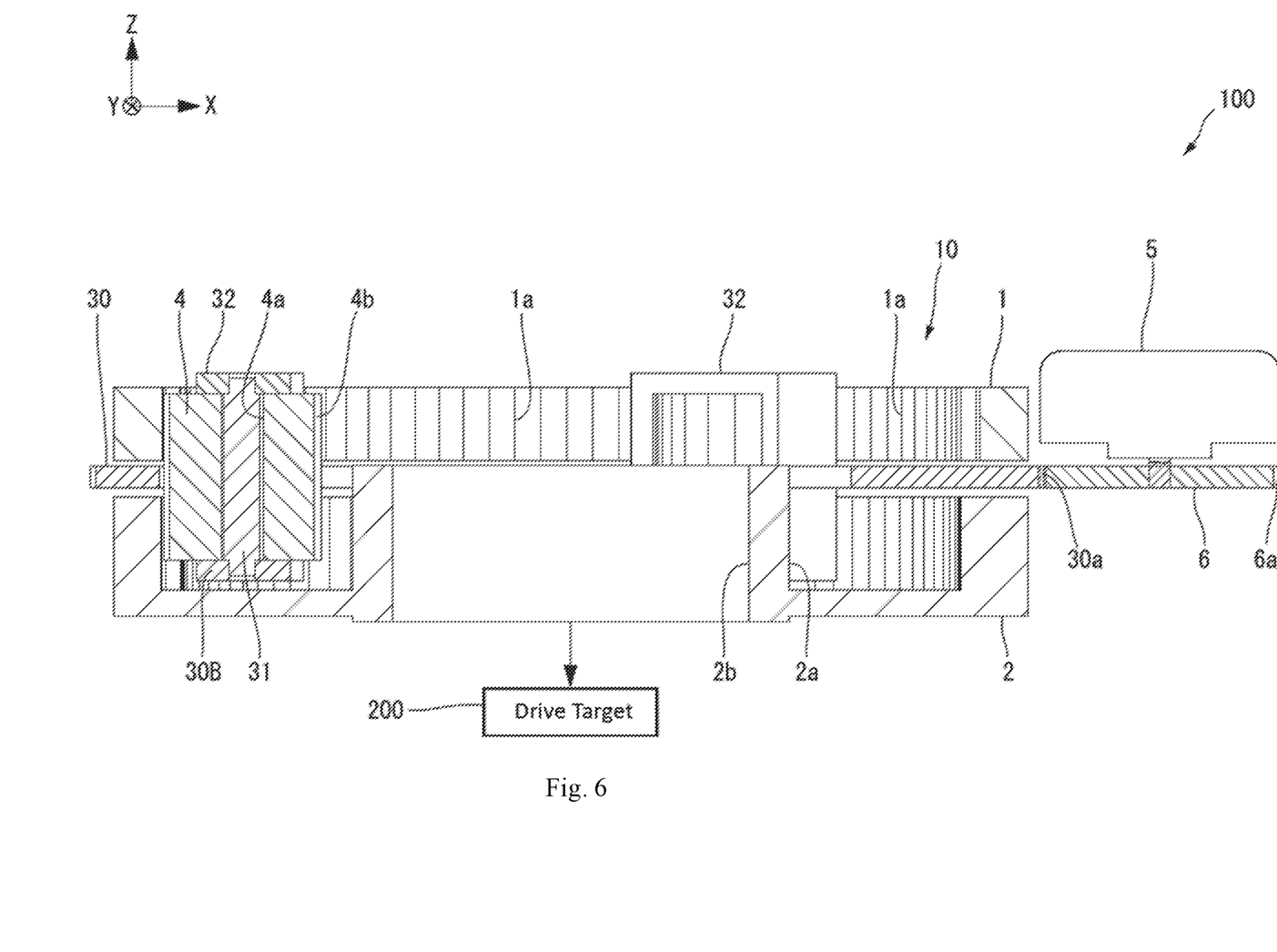
FIG. 6 is a cross-sectional view showing the power transmission mechanism of the actuator according to an embodiment of the present invention.

FIGS. 1 to 6 are diagrams showing a power transmission mechanism of an actuator according to an embodiment of the present invention. FIG. 1 shows a perspective view of the power transmission mechanism of an actuator 100 according to the present embodiment. FIG. 2 shows an exploded perspective view of the power transmission mechanism of the actuator 100. FIGS. 3 and 4 each show a respective plan view of the power transmission mechanism of the actuator 100. FIG. 5 shows a front view of the power transmission mechanism of the actuator 100. FIG. 6 shows a cross-sectional view of the power transmission mechanism of the actuator 100.

The actuator 100 is, for example, an electric actuator that operates a damper shaft of a damper that is provided in a duct of an air conditioning facility and controls air volume. The actuator 100 operates a damper shaft based on an operation signal supplied from control equipment to control air volume.

The actuator 100 includes, as a power transmission mechanism for transmitting a turning force of a drive motor to a damper shaft as a drive target, a reduction gear having a structure, in which a carrier rotatably holding a plurality of planetary gears inputs power of the drive motor, in place of a sun gear in a mechanical paradox planetary gear.

Hereinafter, detailed description will be made on a specific structure of the power transmission mechanism of the actuator 100.

In the present embodiment, in order to clarify the structure of the power transmission mechanism of the actuator 100, detailed description and illustration are omitted for a part of the constituents constituting the actuator 100. For example, the actuator 100 includes an electronic circuit section that controls rotation of a drive motor 5 based on an operation signal input from external (control) equipment, a power supply unit, and the like in addition to the power transmission mechanism; however, detailed description and illustration of such constituents are omitted in the present embodiment.

As shown in FIGS. 1 and 2, the actuator 100 includes the drive motor 5, a motor gear mechanism 6, and a power transmission mechanism 10.

The drive motor 5 is a part that generates a turning force for operating a damper shaft as a drive target 200 when power is supplied to the actuator 100 (at the time of normal operation). The drive motor 5 is an electric motor whose rotation is controlled by power supplied through the electronic circuit section (not shown) described above, and is, for example, a brushless motor.

The drive motor 5 is arranged non-coaxially with a movable internal gear 2 constituting the power transmission mechanism 10. Specifically, as shown in FIGS. 1 to 6, the drive motor 5 is arranged side by side with the power transmission mechanism 10 in a lateral direction of the actuator 100 (in X-axis and Y-axis directions).

The motor gear mechanism 6 is a gear mechanism for transmitting a turning force of the drive motor 5 to the power transmission mechanism 10 at an output stage. In the description of the present embodiment, as an example, the motor gear mechanism 6 is configured with one external gear connected to an output shaft of the drive motor 5.

The power transmission mechanism 10 is a reduction gear that transmits a turning force of the drive motor 5 input through the motor gear mechanism 6 to a damper shaft as the drive target 200. As shown in FIGS. 1 to 6, the power transmission mechanism 10 includes a fixed internal gear 1, the movable internal gear 2, a plurality of external gears 4, and a carrier 3. These parts constituting the power transmission mechanism 10 are housed in a housing (not shown) made from, for example, metal.

The fixed internal gear 1 is a gear part having a hollow structure. Specifically, the fixed internal gear 1 is formed in an annular shape, and includes a tooth (plurality of teeth) 1a on an inner peripheral surface. The fixed internal gear 1 is fixed to, for example, the housing, and is non-rotatably provided.

The movable internal gear 2 is a gear part having a hollow structure. Specifically, the movable internal gear 2 is formed in an annular shape, and is rotatably provided in the housing in a manner coaxial with the fixed internal gear 1. More specifically, the movable internal gear 2 includes a through hole 2b formed at a rotation axis, and an annular groove 2a that is formed in a direction parallel to the rotation axis of the movable internal gear 2 in an area between the through hole 2b and an outer peripheral surface 2c, and concentric with the through hole 2b. A plurality of teeth 2d are formed on an inner peripheral surface of the movable internal gear 2, that is, an inner wall on the outer peripheral surface 2c side of the groove 2a.

The through hole 2b of the movable internal gear 2 can be connected to a damper shaft as the drive target 200, for example, with an attachment (not shown) provided between them. For example, a plurality of recessed sections (or projecting sections)(not shown) may be formed on an inner wall of the through hole 2b, and a plurality of projecting sections (or recessed sections)(not shown) may be formed on an outer peripheral surface of the attachment. By fitting together a plurality of the recessed sections of the through hole 2b of the movable internal gear 2 and a plurality of the projecting sections of the attachment, the movable internal gear 2 and the damper shaft can be connected with the attachment provided between them.

The external gear (planetary gears) 4 is a part that has a tooth (plurality of teeth) 4b on an outer peripheral surface, and rotates along the inner peripheral surface of the fixed internal gear 1 by meshing with the fixed internal gear 1 and the movable internal gear 2. Specifically, the external gear 4 is rotatably held by the carrier 3 described later in a state where the tooth 4b formed on the outer peripheral surface of the external gear 4 meshes with the tooth 1a formed on the inner peripheral surface of the fixed internal gear 1 and the tooth 2d formed on an inner wall of the groove 2a of the movable internal gear 2. The external gear 4 has a through hole 4a formed at a rotation axis thereof.

A plurality of the external gears 4 are arranged on an inner peripheral surface of the fixed internal gear 1. In the present embodiment, description will be made by exemplifying the actuator 100 including three of the external gears 4.

The carrier 3 is a part that rotatably supports a plurality of the external gears 4 and transmits a turning force from the drive motor 5 to a plurality of the external gears 4. The carrier 3 has a tooth that meshes with the gear of the motor gear mechanism 6 on an outer peripheral surface of the carrier 3, and is arranged coaxially with the movable internal gear 2 between the fixed internal gear 1 and the movable internal gear 2. Specifically, the carrier 3 is configured with a plurality of shaft members 31, a base 30, and a plurality of support members 32.

A plurality of the shaft members 31 are inserted in the through holes 4a formed in a plurality of the external gears 4. Both ends of each of the shaft members 31 protrude from the through hole 4a of the external gear 4 in which the shaft member 31 is inserted. Each of the shaft members 31 is held in a manner sandwiched by the base 30 and the support member 32 in a direction parallel to a rotation axis of the external gear 4.

The base 30 is a member that has a tooth that meshes with the motor gear mechanism 6 on the outer peripheral surface of the base 30 and supports an end of a plurality of the shaft members 31. The base 30 is arranged coaxially with the movable internal gear 2 between the fixed internal gear 1 and the movable internal gear 2. Specifically, the base 30 is configured with an annular gear section 30A having a tooth (plurality of teeth) 30a on an outer peripheral surface of the gear section 30A and a support section 30B that supports the gear section 30A on the movable internal gear 2.

The tooth 30a of the gear section 30A meshes with a tooth (plurality of teeth) 6a of one external gear that constitutes the motor gear mechanism 6.

The support section 30B is formed integrally with the gear section 30A, and protrudes from the gear section 30A in a direction parallel to a rotation axis of the gear section 30A. The support section 30B is provided in a manner corresponding to each of a plurality of the external gears 4. In the present embodiment, the base 30 includes three of the support sections 30B. Three of the support sections 30B are placed on a bottom surface 2e of the groove 2a of the movable internal gear 2, so that the base 30 is rotatably supported on the movable internal gear 2.

A hole 30b is formed in each of the support sections 30B. In the hole 30b, a first end of each of the shaft members 31 inserted through the corresponding external gear 4 is inserted.

The support member 32 is a member that supports a second end of the corresponding shaft member 31. The support member 32 is arranged to face the base 30 with the corresponding external gear 4 sandwiched between them in a rotation axis direction of the corresponding external gear 4. A hole 32a is formed in each of the support members 32. In the hole 32a, the second end of each of the shaft member 31 inserted through the corresponding external gear 4 is inserted.

As described above, the carrier 3 fixes both ends of a plurality of the shaft members 31 passing through the rotation axes of the external gears 4 which are sandwiched by the support section 30B of the base 30 and the support member 32. In this manner, a plurality of the external gears 4 are held in a rotatable (able to autorotate and revolve) manner.

The parts constituting the power transmission mechanism 10 described above are made from, for example, a resin material (for example, polyacetal resin). The shaft member 31 of the carrier 3 may be made from metal (for example, SUS).

Next, description will be made on a principle of operation of the actuator 100.

When power is supplied to the actuator 100 and the drive motor 5 is rotated, a turning force of the drive motor 5 is transmitted to the carrier 3 through the motor gear mechanism 6. The carrier 3 that receives the turning force from the drive motor 5 rotates coaxially with the fixed internal gear 1 and the movable internal gear 2. At this time, a plurality of the external gears 4 supported by the carrier 3 receive the turning force from the carrier 3 by meshing with the tooth 1a of the fixed internal gear 1, and rotate (autorotate and revolve) along the inner peripheral surface of the fixed internal gear 1.

The movable internal gear 2 that meshes with a plurality of the external gears 4 is rotated by a turning force of the external gears 4. In this manner, the damper shaft as the drive target 200 connected to the movable internal gear 2 is rotated, and air volume of an air conditioning facility can be controlled.

As described above, the actuator 100 according to the present embodiment includes the power transmission mechanism 10 that has a structure that inputs power of the drive motor 5 from the carrier 3 having a hollow structure that rotatably supports a plurality of the external gears 4 that mesh with the fixed internal gear 1 and the movable internal gear 2 having a hollow structure. According to the power transmission mechanism 10, the drive target 200 can be fixed in a hollow section of the power transmission mechanism 10, and the drive motor 5 can be arranged on an axis line different from a rotation axis (output shaft) of the movable internal gear 2 that constitutes the power transmission mechanism 10. Accordingly, an actuator for a damper of a thinner type can be implemented.

Specifically, as shown in FIGS. 1 to 6, the tooth 30a is formed on the outer peripheral surface of the carrier 3, and the tooth 30a is allowed to mesh with the tooth 6a of the motor gear mechanism 6 connected to an output shaft of the drive motor 5. In this manner, the drive motor 5 can be arranged at a position shifted from the rotation axis of the movable internal gear 2 (output shaft of the power transmission mechanism 10). Accordingly, the entire actuator can be made thin.

In particular, the carrier 3 is arranged coaxially with the movable internal gear 2 between the fixed internal gear 1 and the movable internal gear 2 in a height direction of the actuator 100 (a Z-axis direction). In this manner, the motor gear mechanism 6 that meshes with the tooth 30a of the carrier 3 and the drive motor 5 can be arranged side by side with the fixed internal gear 1 and the movable internal gear 2 in the lateral direction of the actuator 100 (in the X-axis direction and the Y-axis direction). In this manner, volume in the height direction of the actuator 100 (Z direction) can be restricted from widening, and the actuator of a thinner type can be implemented.

The power transmission mechanism 10 can be considered to have a structure of transmitting a turning force from the carrier 3 provided in place of a sun gear in a mechanical paradox planetary gear to the external gear 4 (corresponding to a planetary gear). That is, the power transmission mechanism, which is based on a small and inexpensive mechanical paradox planetary gear, contributes to reduction in size and cost of the entire actuator 100.

The actuator disclosed in JP 2001-153189 A uses a special electric motor including the output axis having a hollow structure, which causes increase in manufacturing cost. In contrast, according to the power transmission mechanism according to the present embodiment, in place of a special electric motor, a general-purpose electric motor is used as the drive motor 5. Accordingly, increase in manufacturing cost of the actuator 100 can be restricted.

For the above reason, according to the power transmission mechanism 10 according to the present embodiment, an electric actuator of a thinner type can be implemented. According to the power transmission mechanism according to the present embodiment, manufacturing cost of the electric actuator can be restricted as compared with a conventional electric actuator.

Extension of Embodiment

So far, specific description has been made on the invention made by the present inventors based on the embodiment. Needless to say, the present invention is not limited to the embodiment, and can be modified in a variety of ways within a range not deviating from the gist thereof.

For example, the above embodiment exemplifies the case where the motor gear mechanism 6 is configured with one of the external gear; however, the number, type, and the like of the gear constituting the motor gear mechanism 6 are not limited to the above.

The above embodiment exemplifies the case where the actuator 100 is applied as an actuator that operates a damper shaft of a damper; however, the present invention is not limited to the above case. For example, the actuator 100 is applicable as an actuator that operates a valve stem of a rotary-type control valve, such as a butterfly valve, used for process control of a flow rate in a plant and the like.

The above embodiment also exemplifies the case where each of the parts constituting the power transmission mechanism 10 is configured with a resin material; however, the present invention is not limited to the above case, and the parts may be configured with other materials. For example, the above parts may be configured with a metal material (for example, a steel material).

What is claimed is:

1. An actuator comprising:
   a fixed internal gear that is formed in an annular shape, comprises a tooth on an inner peripheral surface of the fixed internal gear, and is non-rotatably provided;
   a movable internal gear that is formed in an annular shape, comprises a tooth on an inner peripheral surface of the movable internal gear, and is rotatably provided coaxially with the fixed internal gear;
   a plurality of external gears that mesh with the fixed internal gear and the movable internal gear, and that rotate along the inner peripheral surface of the fixed internal gear, each of the external gears comprising a through hole formed at a rotation axis of each of the external gears; and
   a carrier that is formed in an annular shape, rotatably supports the external gears, comprises a tooth for receiving a turning force from a drive motor on an outer peripheral surface of the carrier, transmits the turning force from the drive motor to the external gears, and is rotatably provided coaxially with the movable internal gear, the carrier comprising:
      a plurality of shaft members inserted in the through holes of the external gears;
      a base that comprises a tooth meshing with a gear of a motor gear mechanism on an outer peripheral surface of the carriers, and that supports respective first ends of the plurality of shaft members; and
      a support member that is arranged to face the base, wherein each of the external gears is sandwiched and meshes with the fixed internal gear and the movable internal gear between the support member and the base in a direction of a rotation axis of the external gears, and that supports a second end of a respective one of the shaft members.

2. The actuator according to claim 1, further comprising:
the drive motor arranged on an axis line different from a rotation axis of the movable internal gear; and
the motor gear mechanism connected to an output shaft of the drive motor, wherein
the tooth formed on the outer peripheral surface of the carrier meshes with a gear of the motor gear mechanism.

3. The actuator according to claim 2, wherein
the carrier is arranged coaxially with the movable internal gear between the fixed internal gear and the movable internal gear.

* * * * *